United States Patent
Luvalle (10) Patent No.: US 9,262,723 B2
(45) Date of Patent: Feb. 16, 2016

(54) PREDICTING CLIMATE DATA USING CLIMATE ATTRACTORS DERIVED FROM A GLOBAL CLIMATE MODEL

(75) Inventor: Michael Luvalle, Morristown, NJ (US)

(73) Assignee: OFS FITEL, LLC, Norcross, CA (US)

( * ) Notice: Subject to any disclaimer, the term of this patent is extended or adjusted under 35 U.S.C. 154(b) by 502 days.

(21) Appl. No.: 13/823,285

(22) PCT Filed: Oct. 4, 2011

(86) PCT No.: PCT/US2011/054748
§ 371 (c)(1),
(2), (4) Date: Mar. 14, 2013

(87) PCT Pub. No.: WO2012/047874
PCT Pub. Date: Apr. 12, 2012

(65) Prior Publication Data
US 2013/0231906 A1    Sep. 5, 2013

Related U.S. Application Data

(60) Provisional application No. 61/389,682, filed on Oct. 4, 2010, provisional application No. 61/542,677, filed on Oct. 3, 2011.

(51) Int. Cl.
*G06F 15/18* (2006.01)
*G06N 7/00* (2006.01)
*G01W 1/10* (2006.01)

(52) U.S. Cl.
CPC ............ *G06N 7/005* (2013.01); *G01W 1/10* (2013.01); *G06N 7/00* (2013.01)

(58) Field of Classification Search
CPC .................................. G01W 1/00; G06N 7/00
USPC ............................................... 706/12, 45
See application file for complete search history.

(56) References Cited

U.S. PATENT DOCUMENTS

2004/0143396 A1 * 7/2004 Allen ...................... G01W 1/10
702/3
2013/0246382 A1 * 9/2013 Cantrell ............ G06F 17/30943
707/706

OTHER PUBLICATIONS

Doll et al., A global hydrological model for deriving water availability indicators: model tuning and validation, 2003, Journal of Hydrology, pp. 1-30.*

(Continued)

*Primary Examiner* — David Vincent
(74) *Attorney, Agent, or Firm* — Mandelbaum Salsburg (57) ABSTRACT

Embodiments generally relate to methods of accurately predicting seasonal fluctuations in precipitation or other approximate functionals of a climate state space, such as the number of heating or cooling degree days in a season, maximum river flow rates, water table levels and the like. In one embodiment, a method for predicting climate comprises: deriving a climate attractor from a global climate model, wherein a tuning parameter for the climate attractor comprises a value of total energy for moving air and water on the earth's surface; estimating a predictive function for each of a plurality of computational cells within the global climate model; and predicting an approximate climate functional of interest for a given specific location utilizing a combination of the predictive functions from each of the plurality of computational cells geographically proximate the location, where at all stages, predictive functions are selected in part by comparison to historical data.

23 Claims, 6 Drawing Sheets

(56) References Cited

OTHER PUBLICATIONS

Li et al., Some Mathematical and Numerjcal Issues in Geophysical Fluid Dynamics and Climate Dynamics, 2007, arViv prepint, pp. 1-30.*

McIntyre, Breaking Waves and Global-Scale Chemical Transport in the Earth's Atmosphere, with Spinoffs for the Sun's, 1998, atmost dynamics, pp. 1-30 Interior.*

Palmer, Global warming in a nonlinear climate—Can we be sure?, 2005, europhysics news, pp. 1-5.*

* cited by examiner

PREDICTING CLIMATE DATA USING CLIMATE ATTRACTORS DERIVED FROM A GLOBAL CLIMATE MODEL

CROSS-REFERENCE TO RELATED APPLICATIONS

This application claims priority to U.S. Provisional Patent Application Ser. No. 61/389,682, filed Oct. 4, 2010, entitled "Statistical Climate Prediction Functions from a Global Climate Model," the disclosure of which is incorporated by reference herein in its entirety. This application also claims priority to U.S. Provisional Patent Application Ser. No. 61/542,677, filed Oct. 3, 2011, the disclosure of which is incorporated by reference herein in its entirety.

BACKGROUND

1. Field of the Invention

Embodiments of the present invention are general to statistical prediction functions derived from chaotic systems and dynamic computer models thereof. More specifically, embodiments of the present invention relate to methods of accurately predicting natural phenomena such as climate fluctuations and earthquakes by accounting for the statistical predictability derived from the chaotic nature of the underlying dynamic systems. More generally, embodiments of the present invention relate to methods of accurately predicting characteristics of any chaotic system for which statistical predictability can be determined.

2. Description of the Related Art

Predicting variations in seasonal precipitation at a local and regional level is important to a countless number of commercial, industrial and recreational activities, ranging from agriculture, to allocation of emergency service resources, to an ideal location for a little league baseball field. It is common in many commercial and industrial fiber optic applications to bury cable underground, often as deep as two meters beneath the earth's surface. The thermal conductivity of the soil surrounding buried cable and electronics can greatly influence their behavior, performance and overall life cycle. Therefore, prediction of the thermal conductivity of soil in a particular region where cable and electronics are buried can be useful in predicting the longevity and performance of the buried components.

It is well established that an increase of moisture in soil enhances its thermal conductivity, and conversely, decreasing moisture reduces its thermal conductivity. However, a single rainfall event is unlikely to change the thermal conductivity. Rather, a change of thermal conductivity of the soil occurs after a consistent change in seasonal rainfall over a particular region. If buried devices show potential sensitivity to changes in thermal conductivity, then prediction-based decisions may be made as to which geographical regions, in which devices are buried, are at risk due to changing thermal conductivity. As such, the accuracy of methods for predicting regional climate patterns is highly important. The value of accurate prediction of earthquakes is apparent.

Currently, there are two primary methods for predicting climate fluctuation: (1) purely empirical methods, and (2) methods based on global climate models. Purely empirical methods, i.e., using the past to predict the future using linear, non-linear, or non-parametric approaches, are often utilized for climate prediction. However, a fundamental flaw in purely empirical methods exists in that such methods fail to account for (and are arguably incapable of accounting for) increasing global temperatures, as there is not sufficient data to estimate relationships correctly. Although arguments are made that various versions of the fluctuation dissipation theorem suggest future climate should linearly depend on the past climate, pure empiricism is unlikely to accurately predict future climate because recent changes in the global average surface temperature, over the past fifty years or so, has resulted in unpredictable changes in the climate attractor, (the attractor represents the possible states the climate can reach along with the possible transitions between the possible states, given a set of tuning parameters (e.g. global average surface temperatures). With a warming world, the attractor, and hence those possible states and transitions are changing). Empirical methods are the predominant method for earthquake prediction currently and are supported by scientific arguments. For example, current state of the art earthquake prediction is based on very slight modification of historical rates using a moving average of recent nearby located events. However, empirical methods do not take advantage of chaos theory and are inherently limited.

Methods based on a global climate model (GCM), or ensembles of GCM's, are often utilized to predict climate. The GCM's generally require setting the conditions of the ocean similar to ocean conditions at some time in the recent past, and doing so several times using different starting conditions to represent uncertainty in the starting conditions. From there an ensemble of trajectories is used for prediction. While GCM's are generally more accurate than empirical methods for long time periods (e.g., multiple decades), misidentification of relevant initial conditions often yields inaccurate results at shorter time scales which are typically of interest, such as a single season or up to a decade.

Thus, there is a need for an improved method of predicting seasonal fluctuations in precipitation or other approximate functionals of a climate state space at an interseasonal to interannual time scale. Similarly, there is a need for reliable earthquake prediction on a time scale shorter than multiple decades.

SUMMARY

Embodiments of the present invention are generally related to prediction of variables derivable from the evolution in time of a chaotic system. In particular, statistical prediction functions may be derived from computational dynamic models, and/or historic data. More specifically, embodiments of the present invention relate to methods of accurately predicting seasonal fluctuations in precipitation or other approximate functionals of a climate state space, such as the number of heating or cooling degree days in a season, maximum river flow rates, water table levels and the like. They also relate to predicting the number and average magnitude of earthquakes in a given time period.

In one embodiment of the present invention, a method for predicting climate comprises: deriving a climate attractor from a global climate model, wherein a tuning parameter for the climate attractor comprises a value of total energy for moving air and water on the earth's surface; estimating a predictive function for each of a plurality of computational cells within the global climate model; and predicting an approximate climate functional of interest for a given specific location utilizing a combination of the predictive functions from each of the plurality of computational cells geographically proximate the location and a set of historical data regarding the climate functional and the state variables used in the models (e.g. ocean indices).

In another embodiment of the present invention, a method for predicting climate comprises: deriving a climate attractor from a global climate model, wherein the steps of deriving the climate attractor comprise at least one of: (a) running the global climate model a plurality of times through a predetermined global average surface temperature, using different realistic starting points and using realistic trajectories of greenhouse gas levels, until there is sufficient characterization of the statistical structure of the assumed attractor, or (b) setting a greenhouse gas level at a steady state, then running the global climate model until it reaches a steady state global average surface temperature proximate a target global average surface temperature for a plurality of years, until there is sufficient characterization of the statistical structure of the assumed attractor, wherein a tuning parameter for the climate attractor comprises a global average surface temperature; estimating a predictive function for each of a plurality of computational cells within the global climate model, wherein such estimation comprises: selecting an approximate functional of climate of interest, selecting a set of state variables for the approximate functionals, determining an initial set of predictor functions from the climate attractor, and ascertaining a predictor function within the initial set of predictor functions having the highest positive correlation to the climate of interest when applied to a set of historical data regarding the climate of interest; and predicting an approximate climate functional of interest for a given specific location utilizing a combination of the predictive functions from each of the plurality of computational cells geographically proximate the location.

In yet another embodiment of the present invention, a system for predicting climate comprises: a computer-readable medium comprising a computer program having executable code, the computer program for enabling data pairing, the computer program comprising instructions for: deriving a climate attractor from a global climate model, wherein a tuning parameter for the climate attractor comprises a value of total energy for moving air and water on the earth's surface; estimating a predictive function for each of a plurality of computational cells within the global climate model; and predicting an approximate climate functional of interest for a given specific location utilizing a combination of the predictive functions from each of the plurality of computational cells geographically proximate the location and a set of historical data regarding the climate functional and the state variables used in the models (e.g. ocean indices).

In a further embodiment of the present invention, a method of utilizing a dynamic system, characterized by nonlinear deterministic or stochastic differential or difference equations, to construct estimates of strange attractors comprises performing one of: running the dynamic system with constant tuning parameters for a sufficiently long time to allow for an estimation of the statistical characteristics of an attractor, or running the dynamic system several times through a set of tuning parameters of interest; extracting a plurality of linear prediction functions from state variables or functions of state variables of the dynamic system, or extracting linear functions from a historical data set deemed to be able to approximate the attractor; and comparing the linear prediction functions to historical data of the dynamic model (in the future of the historical data set used for initial linear function generation for the latter case) to extract predictive functions therefrom.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are general to statistical prediction functions derived from detailed dynamic computer models, and/or historical data. More specifically, embodiments of the present invention relate to methods of accurately predicting climate, earthquakes, or other phenomena governed by nonlinear dynamic systems leading to chaos by accounting for the statistical predictability derived from the chaotic nature of the dynamic patterns.

Generally, embodiments of the present invention integrate chaos theory, climate theory (or other specific subject theory), and statistical theory into a method of jointly analyzing the output of a computerized dynamic model (specifically in the case of climate a GCM) and historical data. In most climate focused embodiments, the method comprises running a GCM under constant tuning parameters to estimate an appropriate climate attractor, and then applying the fluctuation dissipation theorem (FDT) to estimate predictive functionals of the past climate state to predict the future of the relevant functionals that are appropriate, using real data to select the functionals which are most appropriate to the starting conditions in the real world.

For purposes of embodiments of the present invention, it is presumed that, for example, the earth's climate is chaotic, and as such, evolves about a "strange attractor," also referred to as a "climate attractor" herein. In the case of earthquakes, it is presumed that the dynamic system driving earthquakes is chaotic, and evolves around a strange attractor, whereas the measurements on earthquakes comprise functionals of the state space of the dynamic system which may be used for prediction just as the variables of the state space may. As understood by embodiments of the present invention, a "strange attractor" is a set towards which a dynamic system, such as the earth's climate, evolves over time under constant tuning parameters. As discussed herein, when sufficient information about a past history of a dynamic system with constant tuning parameters is available to accurately establish the form of the "strange attractor," then short-term predictions can be made about future events in a small neighborhood of those same tuning parameters.

Figure 1:
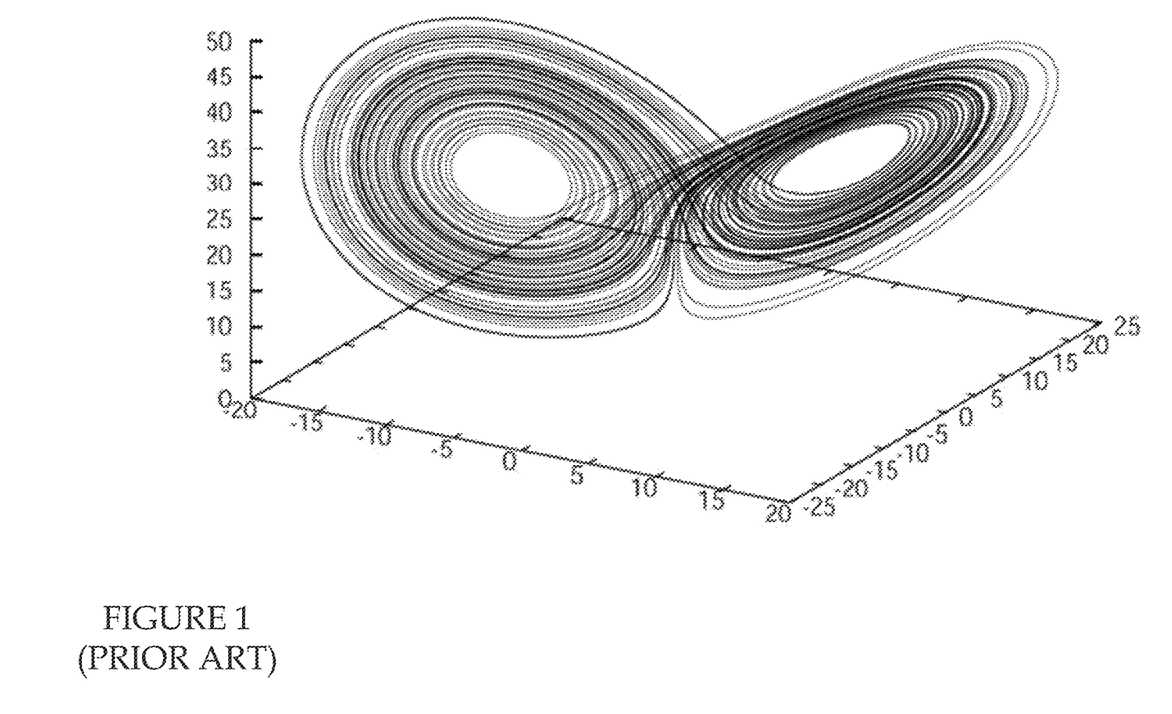
FIG. 1 depicts a graph of the Lorenz oscillator, whose long-term behavior gives rise to the Lorenz attractor.

The most common example of a "strange attractor" is the Lorenz Attractor. The Lorenz attractor is an example of a non-linear dynamic system corresponding to the long-term behavior of the Lorenz oscillator. The Lorenz oscillator is a 3-dimensional dynamical system that exhibits chaotic flow, noted for its lemniscate shape, as seen in FIG. 1. The attractor itself was derived from the simplified equations of convection rolls arising in the equations of the atmosphere.

In addition to its interest to the field of non-linear mathematics, the Lorenz model has important implications for climate and weather prediction. The model is an explicit statement that planetary and stellar atmospheres may exhibit a variety of quasi-periodic regimes that are, although fully deterministic, subject to abrupt and seemingly random change. From a technical standpoint, the Lorenz oscillator is nonlinear, three-dimensional and deterministic. However, for a certain set of parameters, the system exhibits chaotic behavior and displays a strange attractor, which in this case, is considered to be a fractal of Hausdorff dimension between 2 and 3. While Hausdorff dimension is of common use in studies of fractals, box dimension is an alternate way of defining the dimension of fractal structures and is useful in the theorems applied to chaotic systems. Box dimension is the limiting ratio of the number of $\epsilon$ sided boxes it takes to cover the fractal structure divided by minus 1 times the log of $\epsilon$ as $\epsilon$ shrinks to 0. The box dimension of the Lorenz attractor is also between 2 and 3. For the discussion here, box dimension will be used, though any suitable method for determining the dimension of the strange attractor may be used.

In accordance with embodiments of the present invention, by utilizing a strange attractor approach, the initial condition parameters of a chaotic system do not need to be entirely accurate in order to predict properties of a future state. Such a presumption is supported by numerous mathematical theories. Under a first theory, whereas strange attractors are ergodic by nature, the strange attractor and its statistical properties can be fully identified so long as the system can be run for sufficient time with fixed "tuning parameters."

Similarly, under Taken's thereom, as well as other related embedding theorems, a time series of a single state variable is sufficient for constructing the strange attractor up to an isomorphism which indicates whether using time series of only a few (well selected) variables may provide sufficient information to approximate the statistical relationships in the attractor. In addition, under various versions of the FDT, there is justification for focusing on linear models to obtain the predictive functions.

Figure 2:
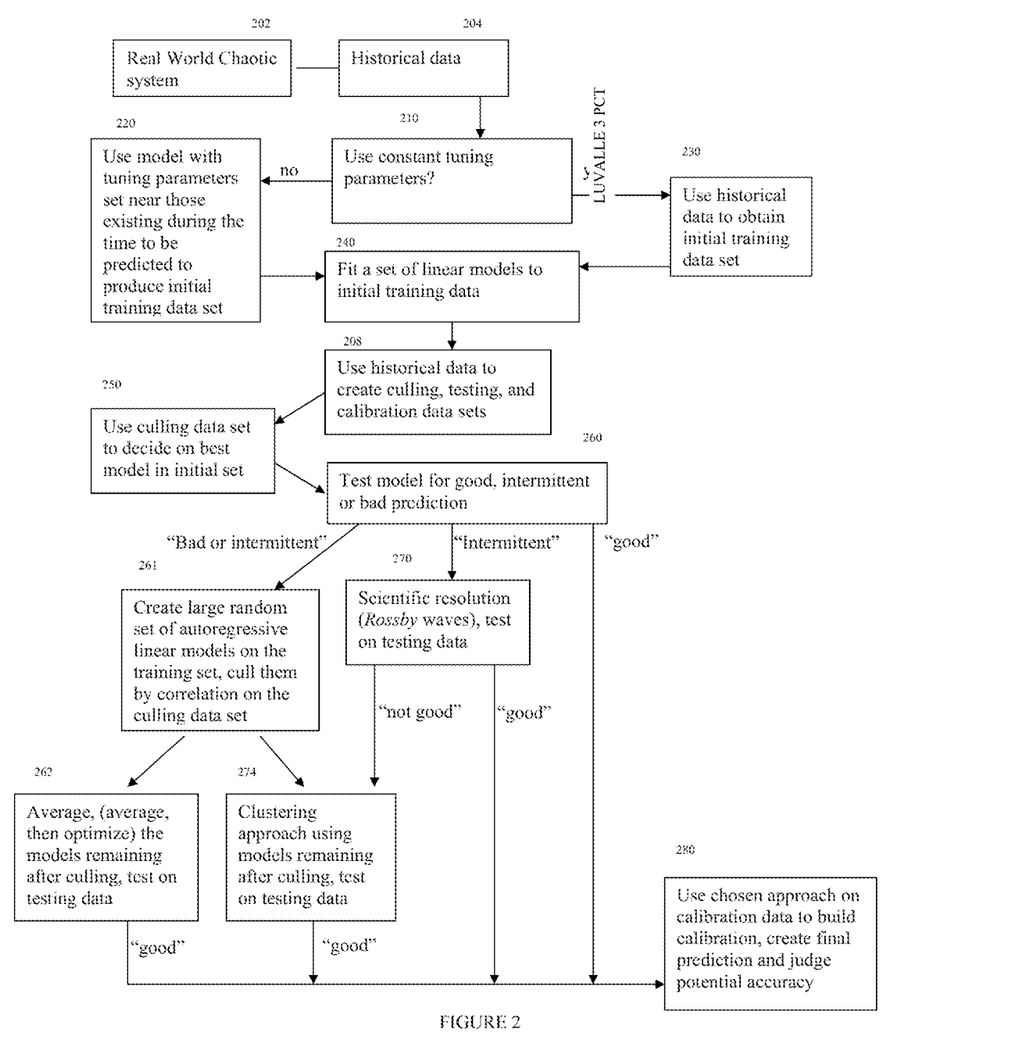
FIG. 2 depicts a flowchart of a method of obtaining predictions in a real world chaotic system, in accordance with embodiments of the present invention.

To better explain the above, FIG. 2 depicts a flowchart of a method of obtaining predictions in a real world chaotic system, in accordance with embodiments of the present invention. The method 200 begins by assessing a real world chaotic system 202, for example, weather on the earth's surface. Generally, such a real world chaotic system for which there exists historical data 204 (i.e., past records) regarding the parameter of the chaotic system sought to be predicted along with scientific models of the system. At step 210, the method 200 evaluates whether the known data indicates the system has constant tuning parameters according to what is currently known in a scientific sense about the system.

For purposes of embodiments of the present invention, the "tuning parameters" are operating characteristics that may be substantially fixed, or at least identifiable, over a sufficiently long period of time to establish the form of the strange attractor (e.g., a value of total energy available to move air and water on the earth's surface, a fixed global average surface temperature (GAST), greenhouse gas concentrations, seasonal polar snow cover, seasonal polar ice, various parameters of tropical rainforest cover, various parameters of vegetation, geographical features (e.g., mountain ranges, etc.), cities and their parameterizations, percent land under clear cut agriculture, incident sunlight (i.e., if using small reflectors), sulfur dioxide present in the stratosphere, parameters around significant structures (e.g. massive water current energy farms which might change water flow) that effect ocean or atmospheric dynamics collectively or individually, total money in circulation in a monetary system, and/or the like). Using the climate prediction example, since the atmospheric part of the climate system evolves more quickly than the oceanic system, from the point of view of the atmospheric strange attractor, the oceanic system might be considered a tuning parameter. Thus, in one embodiment, the linear pattern best predicting precipitation may change with changing ocean effects. For the chaotic system governing the size and accurance of earthquakes, similar parameter might be tidal systems, distribution of weight along the crust, and temperature structure of the mantle and core, among others.

If the known data indicates the system does not have constant tuning parameters at step 210, in many embodiments of the present invention, the statistical properties of the strange attractor may be obtained in one of two ways via a computer model, at step 220. In the case of climate prediction in which the global average surface temperature (GAST) is used as a tuning parameter, the computer may (1) run a global climate model several times through a targeted GAST range from different starting points based on real data; or (2) run a global climate model constructed to come to a steady state at or near a targeted GAST, and allow the model to run for a significantly long time. Under the first approach, if the global climate model and the rate of rise in the GAST are good representations of realistic climate patterns, the accuracy of the results may only be dependent upon a sampling of a good set of initial points. In other dynamic systems, other appropriate dynamic computer models may be substituted for the GCM, and other appropriate tuning parameters may be substituted for the GAST.

However, the second approach is dependent upon the ergodicity of the strange attractor, and both continuity and a lack of hysteresis in the strange attractor as a function of the GAST. In particular, the climate trajectories in the neighborhood of the targeted GAST should be well modeled by climate trajectories sampled from a system in which the GAST has reached a steady state. In either approach, the GCM is run to the requisite state that statistical estimates useful for prediction may be extracted from the assumed attractor at step 222.

Referring back to step 210, if the known data indicates constant tuning parameters may exist, at step 230 the historical data 204 may be analyzed and an initial estimated attractor may be derived from the historical data. Generally, such derivation may occur using a computer system/program to identify patterns in the data and approximate such initial attractors.

A prediction problem requires a time period where prediction (or possibly post diction) is desired. In such a case, historical data are needed from disjoint time periods (e.g., three or more), and perhaps an additional time period if the initial training data comes from the historical data. Generally, these disjoint time periods include a culling period, a testing period, and a calibration period. In one embodiment, all three time periods should be from conditions with the tuning parameters as close as possible to those of the period to be pre- (post-)dicted.

Once the initial strange attractor estimate is obtained, e.g., consisting of the initial training data (either 220 or 230), it may give rise to an initial set of predictive functions in the form of autoregression at step 240 (e.g., a type of regression supported by Taken's theorem, the fluctuation dissipation theorem, and/or the like). In many embodiments, the linear model comparisons may be performed in order to extract regional predictive functions over relatively large regions corresponding to computational cells in the GCM(s) or collections thereof, for example.

In most GCM's the computational cells are rectangular in latitude and longitude for computational convenience, and may be divided into as many altitude segments as the computer may reasonably calculate. Similarly, in other embodiments, varying measurements based upon latitude and longitude coordinates and altitude may be provided for the computational cells, as long as the cells cover the part of the earth relevant for generation of climate.

Generally, to extract a regional predictive function for a particular computational cell, an approximate functional of the system of interest (e.g. precipitation, maximum snow depth, etc.) within that cell may be selected. Such selection may be based upon mere interest of the operator, need for prediction of specific system anomalies, or for any other suitable reason within embodiments of the present invention.

After the approximate functional is selected, an appropriate set of state variables, and functionals of state variables (e.g., local temperature and precipitation, ocean indexes for ocean oscillations, etc.) and a set of lags (e.g., 1 season before, 2 seasons before, . . . , n seasons before, where n is any reasonable numeral suitable for embodiments of the present invention), to explore as potential predictors may be chosen.

For reasonable efficiency and parsimony of the model, the set of state variables and functionals may comprise those with known or suspected scientific relationship with the functional of interest, and for which good historical data is available for a period immediately prior to where predictions are desired. For the specific case of climate prediction, the set of state variables and functionals may be chosen based on their climatological relationship with the functional of interest, and in many embodiments, for ease of computation, it may be desirable to standardize all variables by subtracting seasonal means and dividing by standard errors. The standardization may be conducted on both the state variables and functionals from the attractor estimate, and from the historical data being utilized.

In many embodiments, an initial set of "best" predictor functions may be determined from the attractor estimate step 250. Generally some form of model culling or selection using correlation with historical data is performed to remove models which do not show much predictive ability. In some cases, within the initial set, a single predictor function may be identified with the highest positive correlation to the variable of interest when applied to the actual data set, using some statistical criterion for variable selection to determine "best" (e.g. false discovery rate theory). In other cases a set of models remains, and either an average, with or without further optimization step 262, or a majority vote among the models, step 274, may be used to determine an initial set of "best" predictor functions. This may be accomplished, for example, by two model cluster analysis at each time point, taking a measure of centrality of the largest cluster as the estimate).

The use of traditional statistical error detection approaches, such as the false discovery rate theory, may help in accurate identification of predictor functions over large regions by examining the fit of plausible predictor functions over the history of several much smaller sub-regions, and using both the multiplicity of smaller sub-regions fitting the same functional form and the statistical significance of the fit to help identify accurate predictor functions. Similarly, in many embodiments, relatively short time frames (e.g., 6 years or 24 seasons) should be considered to define the predictor functions with higher accuracy.

Once the "best" set of predictor functions is determined, a neighborhood of values of the variables used in the predictor function may be created, and using the attractor estimate, an additional set of predictor functions associated with that neighborhood of the variable of interest may be calculated. Applying the statistical error detection discussed above, potentially "better" predictor functions may be determined. As such, this process may be repeated until the predictor functions are deemed to yield the best results.

In many embodiments, after the predictor functions are determined by the means described above, the accuracy of the prediction system may still not be at its optimal and/or desired levels. At step 260, the method 200 determines whether the prediction in time seems intermittent good, or bad (and possibly at steps 262, 270, and 274). An intermittent prediction is one in which the prediction has sufficient accuracy for some time periods but not others. This can occur if the dimension of the reconstructed attractor is inappropriate to the dimension of the true attractor. In such cases, several methods, such as scientific resolution, averaging plus optimization, or clustering, may be used to improve the prediction. In general, the best approach to use in predicting the future will have the number of terms in the autoregression more than twice the box dimension of the true attractor. However, in most applications there is not enough data to estimate the box dimension of the true attractor, but a test of further prediction provides a simple means to gauge the efficacy of the chosen approach.

In one embodiment, at step 262, the method 200 may allow a simple averaging of the culled prediction(s), supra, to determine a better prediction. Alternatively, a highly regularized optimization process may be applied, such as those disclosed in U.S. Patent Application Ser. No. 61/542,677, filed Oct. 3, 2011, entitled "Prediction in Chaotic Systems: Interseasonal to Interannual Precipitation and Earthquakes" (hereinafter "PCS Application"), the disclosure of which is incorporated herein by reference in its entirety. At the same time, at step 264, a clustering process (e.g., a topological resolution) may allow for the various data to yield a plurality of clusters. In many embodiments, selecting the largest clusters yields an accurate prediction. Following steps 262 and 264, a test for intermittent accuracy can determine whether the relative dimension of the reconstructed strange attractor is appropriate to the dimension of the true attractor The results can indicate whether averaging or clustering yields the better prediction.

At steps 262, 270, and 275, the near full dimension of the variously combined autoregressive models resulting from step 250 or 261 is compared to that of the attractor estimate, via the test of further prediction in time as in the PCS Application. In general, when the near full dimension of the reconstructed attractor is greater than twice the box dimension of the true attractor, plus one, the dimension test indicates that averaging or highly regularized optimization may provide a best approach. However, where the near full dimension of the reconstructed attractor is less than twice the dimension of the attractor, plus one, the clustering method will likely provide the best approach. In either instance, the result of the dimension test may yield a prediction result at step 280.

In certain embodiments it may be desirable to utilize complementary predictive functions of proximate regions over longer times. For purposes of embodiments of the present invention, predictive functions are complementary to each other if they trade off which function provides a more accurate predictor at a particular region over a particular time period.

Often, when complementary predictive functions are determined for a particular region, it may be difficult to determine which of the predictive functions are active (or more accurate) at the local level (e.g., at a weather station) for a specific time period. In many embodiments, one or more transformation-based regression estimates of probability (e.g., logistic regression, probit regression, or the like) may be utilized to determine the likelihood of accuracy of each of the complementary predictive functions at any given time. Optionally, however, a second stage of selecting a logistic regression (or multinomial logistic regression) for a local estimate after selection of two (or more) complementary predictive functions may be utilized. The additional logistical regression steps may be advantageous where multiple complementary predictive functions are considered. Alternatively, simultaneous selection of complementary linear predictors and logistic regression may be used to identify the optimum.

At step 270, while the above probability methods (i.e., steps 262 and 274) may yield fairly accurate results in determining which complementary predictive functions are active, there may be certain instances whereby it is possible to identify extrinsic factors which influence the level of activity of the complementary functions. In that instance, interference from such factors can be approximated and further accounted for in the model. For example, Rossby waves, which are large meanders in high-altitude winds that play a significant role in determining jet steam patterns, may generally be accounted for in modeling of climate systems. In one specific embodiment, Rossby waves may be treated as theoretical standing waves in the jet streams driven by predictable ocean oscillations, where the frequency is proportional to the ocean indices, and the waves from different oscillations interfere, both on the same jet steam and across jet streams, in the same hemisphere. The predicted ocean oscillation indices may be derived using the same iterative approach as described above for the predictor functions associated with the computational cells, only with much longer time lags (e.g., 18 years).

It should be apparent that meandering of the Rossby waves through the computational cells may alter which predictor functions are active at a particular time. As such, knowledge or prediction of Rossby waves can improve selection of predictor functions. Analogous extrinsic factors may be identified for other chaotic systems, such as mantle plumes in the earthquake system. The resulting model may be tested against further prediction to determine if it or a cluster based (274) or an averaging based (262) prediction is better.

Utilizing theoretically defined standing wave structures in the climate system to define probability amplitudes (i.e., similar to the interpretation of probability amplitudes in quantum mechanics) may assist in the estimation of which complementary predictor function is active at a particular local level. For example, the probabilities of combination of the predictor functions can be calculated using the modulus of the Rossby waves by assuming the Rossby waves are analogous to the probability amplitudes in quantum mechanics.

In certain embodiments, the Rossby waves calculated probabilities of combination of the predictive functions may be utilized as a minimum standard in estimating the probabilities, and assuring that all estimates do at least as well. This provides a method of regularizing the predictions to reduce the possibility of overfitting. In one exemplary embodiment, a more accurate result may be obtained through a Bayesian combination of the Rossby wave probability with a probability of combination using a logistic regression method based on a linear model estimation.

Once local level prediction results are obtained, they may be combined within a broader region to make a regional estimate (e.g. by simple averaging). In many embodiments, regional predictions are most accurate when built up from averaging local predictions, as opposed to broad regional approximations described above. This may be useful in cases where the regional estimates are inherently limited. For example, the accuracy of the jet stream approximation dictates the accuracy of regional predictions, so averaging of local predictions, which may be less sensitive to jet stream perturbations, may yield more accurate results.

In certain embodiments, the use of computational cells to define initial predictor functions for use as complementary predictor functions may be overly coarse. For such embodiments, subdivisions of the computational cells may be constructed, derived for example by locating on a map, regions within the computational cell where that predictor function for the cell does not work well, or by geographical insight. A simple example of this is when a cell contains a mountain range which affects local climate. These subcells may be used to do a reselection of predictor functions within each defined subcell, using the simulated calculations from the original predictor cell. These new initial functions may be additional candidates for complementary functions.

Alternatively, the GCM or regional climate model could be rerun with redefined subcells. New initial functions derived with redefined subcells may also be additional candidates for complementary functions.

Additional features of embodiments of the present invention are disclosed with reference to the Experimental Embodiment described infra, as well as the following optional steps in potentially enhancing the data and results of steps of the methods disclosed herein.

In some embodiments, it may be advantageous to utilize a partial likelihood posterior probability of the Rossby wave switch indicator, to select better estimated weather stations. In particular, for certain embodiments, this may help identify regions in which physical climate modeling requires a more local estimate of the regional linear prediction function, where the existing nearby functions are not sufficient to produce adequate prediction in a region. It also may be possible to identify a geo-climatic weighting based on the best weather station estimates resulting in better prediction in the region.

In some embodiments, the identification of precipitation conservation regions over which the summation of an individual weather station level, or small regional predictions, result in predictions with correlations significantly higher than those achievable at a smaller level helps to identify when the procedure is working. In cases where such conservation works, the use of Stein shrinkage procedures may improve mean squares error and correlation at the individual weather station level, and at the mean level if done with attention to bias correction.

Optionally, the use of the early measurements during the prediction period may calibrate a high correlation prediction. Similarly, in some embodiments, the use of tests of departure may identify when (and where) the true climate system is sufficiently far from the estimated attractor(s) that either tuning parameters need to be switched or the physics of the model(s) needs to be adjusted.

In certain instances, the use of a second estimated attractor produced at a different steady state GAST (or other tuning parameters useful for simulation of other chaotic systems), coupled with the full estimation procedure described above to produce a second set of predictions, and the subsequent use of sequential probability ratio tests, or other statistical testing procedure, may identify which of the two attractors indexed by GAST is appropriate to be using at the time. Furthermore, the use of perturbation methods in the parameters of the GCM attractor combined with regression on observed data may identify what alterations in the physics might make the most useful improvements in regions where improvements are needed.

Experimental Embodiment

As disclosed herein, the exemplary experiment describes using statistical models derived from a single individual greenhouse gas scenario with steady state close to the GAST in 1994-2010, to predict ground data from 2008-2009 in the continental United States.

In the exemplary embodiment, it was assumed that the climate system does not have constant tuning parameters due to the accumulation of greenhouse gases in the atmosphere. The experiment consisted of four simulations using a global climate model. Greenhouse gas concentrations were set to four levels, those from 1958, 1985, 1988, and 2007. Each simulation was denoted by the year corresponding to the greenhouse gas concentrations followed by the letters "gg."

Figure 3:
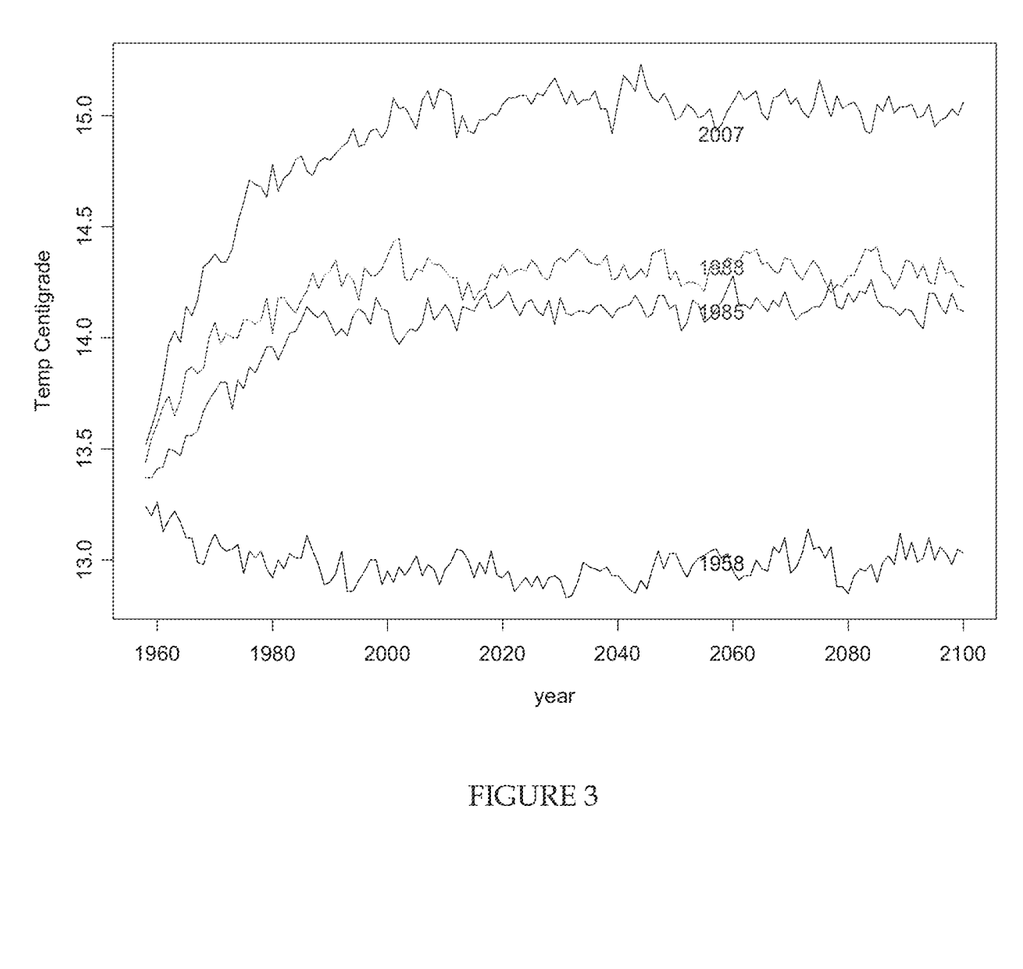
FIG. 3 depicts a graph showing an example of global average surface temperatures in accordance with one experimental embodiment of the present invention.
Figure 4:
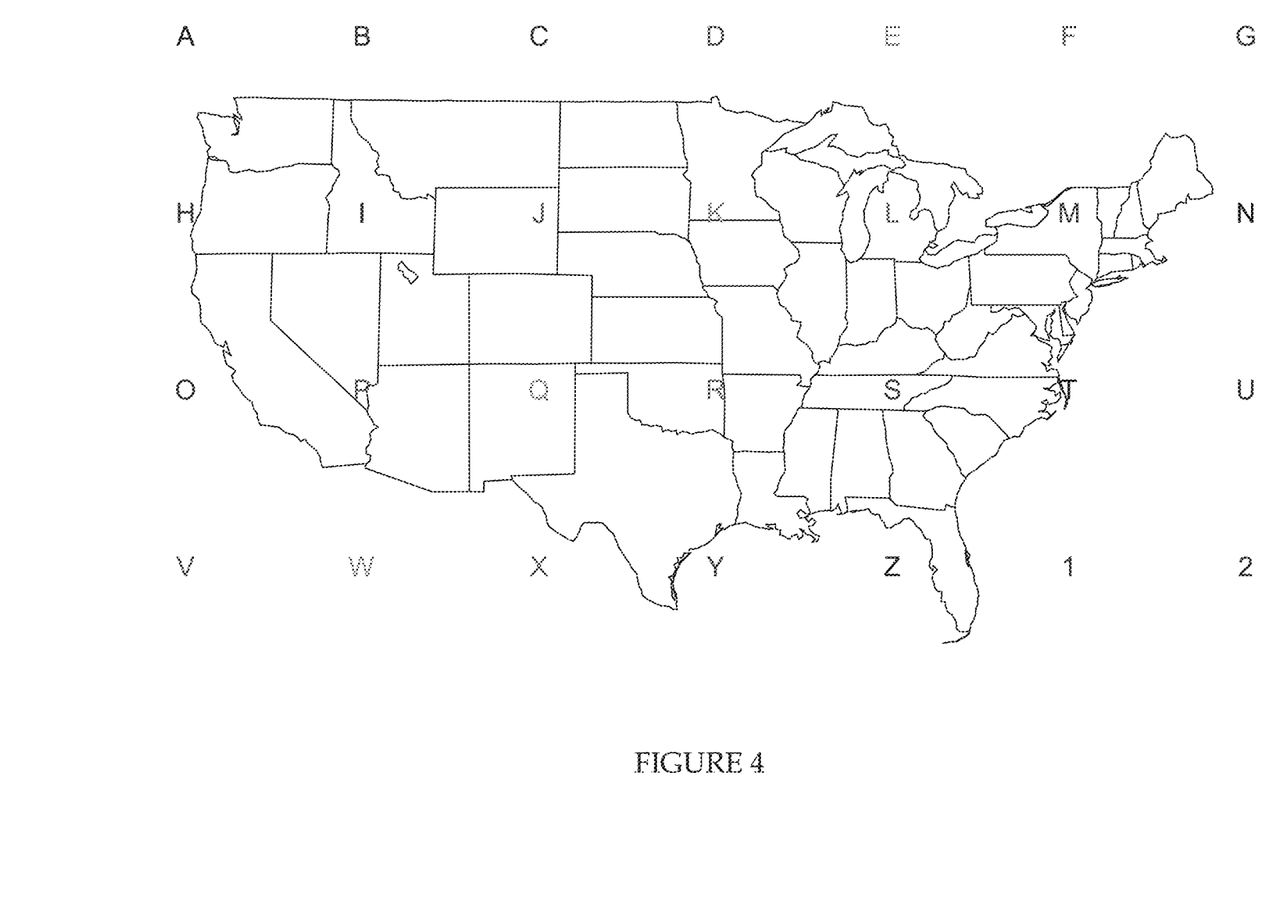
FIG. 4 depicts the computational cells of a global climate model near the continental United States in accordance with another experimental embodiment of the present invention.

The GCM simulations were run from 1958 to 2100. The temperature started at the historical 1958 level, and rose naturally to a steady state which varied with greenhouse gas concentration. FIG. 3 depicts a plot of the GAST for each run. In the 1985gg and 1988gg runs, the climate structure is assumed to have reached a steady state from 2000 to 2100 because the GAST has. This region of the simulation provides the basis for the linear model selection. Prediction was done on the 2007gg run from 1960 through 1990, and on the 1958gg and 2007gg runs from 2000 to 2100.

For purposes of this experiment, a commercially available GCM was utilized for running the simulations, known as the EdGCM 3.1.1 system from The EdGCM Cooperative Project of Columbia University, and available at http://edgcm.columbia.edu. The climate model at the core of EdGCM was developed at NASA's Goddard Institute for Space Studies (GISS) and is an updated version of the commercially available, GISS Model II.

From these initial results, further tests were conducted using data from the continental United States As such, a data set comprising daily temperature and precipitation records for the continental United States and Canada, on a 1° by 1° grid from 1900 through 2003 was obtained. Initial prediction studies were based on using only local temperature and precipitation studies, but it was later determined that results could be improved significantly by using ocean index information as well. In particular, three ocean driven oscillations were included, the ENSO oscillation (using the MEI index (see e.g., http://www.esrl.noaa.gov/psd/people/klaus.wolter/MEI/)), the pacific decadal oscillation (using the PDO index (see e.g., http://jisao.washington.edu/pdo/), and the arctic oscillation (using the AO index http://www.cpc.noaa.gov/products/precip/CWlink/daily_ao_index/loading.html).

Figure 5:
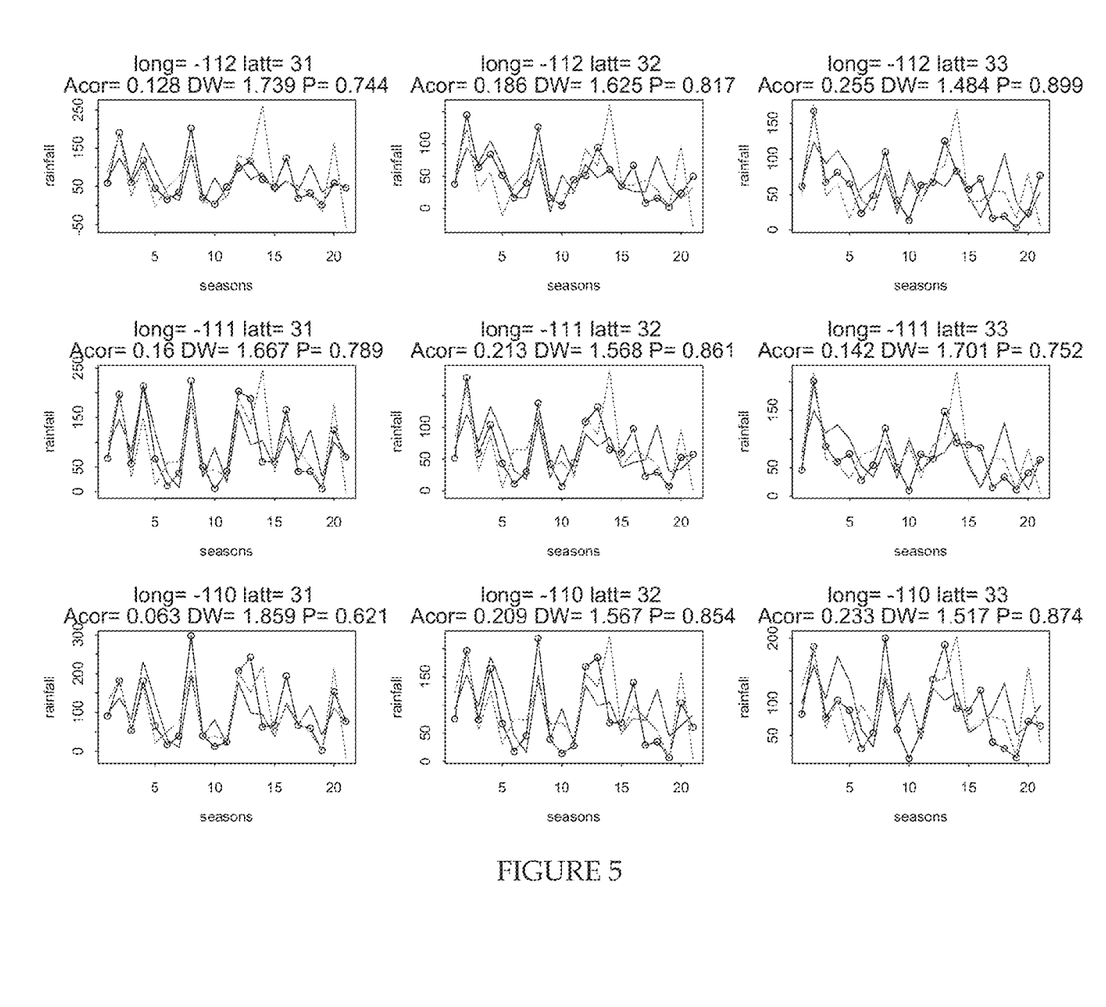
FIG. 5 depicts a plurality of data points showing the complementation between models built around two different computational cells in accordance with another experimental embodiment of the present invention.
Figure 6:
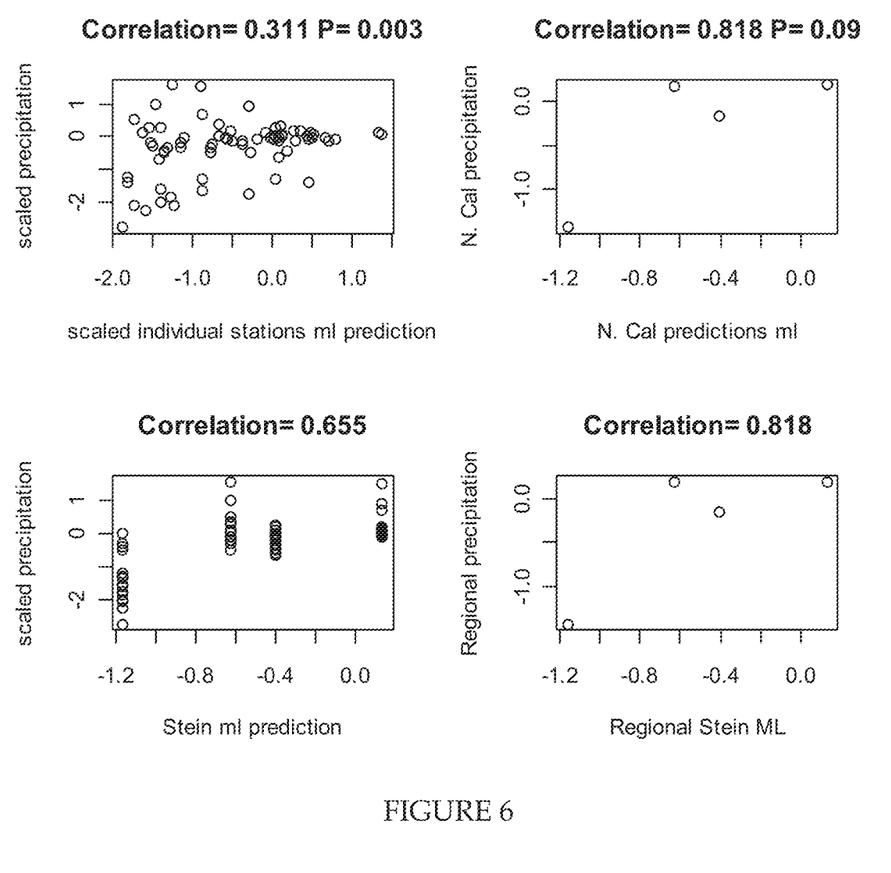
FIG. 6 contrasts individual and regional predictions in Northern California, with and without correction of the shrinkage bias and use of Stein estimation to make the individual estimates better predictors, in accordance with yet another experimental embodiment of the present invention.

Using the estimate of the climate attractor derived above, these indexes were roughly represented by standardized differences of primary variables calculated over rectangular approximations over the oceans of the 1st principle components from an empirical orthogonal function analysis. For example, the ENSO index was approximated by a standardizing linear combinations of trimmed means of sea level pressure (SLP) and sea surface temperature (SST) over two regions of the pacific ocean, the PDO index was approximated by a standardized linear combination of trimmed means SST over two regions, and the AO index was approximated by a standardized linear combination of trimmed means of the 1000 mb height over 3 regions. The centers of the computational cells used in this analysis from the GCM are shown in FIG. 5.

The detailed algorithm for choosing the predictive linear autoregression assigned to each cell is described in detailed in U.S. Provisional Patent Application Ser. No. 61/389,682, the disclosure of which is incorporated by reference in its entirety (hereinafter the "LuValle Application"). The algorithm essentially iterates between selecting a group of predictive linear models in the derivation of the climate attractor from the GCM, and assessing the correlation (positive correlation only) in the database of actual data from years 1994 through 2000, in each 1° by 1° cell in a neighborhood of the computational cell. The neighborhood was extended 1 to 2 degrees on each side of the computational cells defined by the GCM, resulting in some potential for overlap, and allowing the approach to indicate perhaps more naturally shaped computational cells. The criterion for choosing a regression to further explore the neighborhood of the spun up attractor was a criterion based on using FDR calculated across tests of the significance of the positive correlation across all the 1° by 1° cells in the neighborhood.

Because of the statistically odd structure of the correlation estimation process, using an autoregression derived from a computer model, but choosing the best of a finite number of these, standard significance testing might be suspect, so, the significance of the correlation was estimated by comparing the correlation to correlation achieved with random permutations of the time index. A model was considered an improvement if either the significance level in the cells, or the number of cells at a given significance level could be improved, with a final model being one where no further investigation of the neighborhood of the model (either subtracting 1 variable from the regression, or adding 1 variable to it) would result in improvement. The final predictive fits were found by the scaling method described in detail in the LuValle Application, followed by adding back in the seasonal means as in 280.

When the final linear models where computed, and mapped using the 1° by 1° cells, there were several regions where the computational cells overlapped, where significantly different models provided good predictors. Examining these regions extending the projections out to 2003, the predictive plots showed that the two linear models often complemented one another, with one model providing good prediction in some time periods, and the other providing good prediction in another. FIG. 5 shows this complementation between the model built around the P computational cell, and the model built around the W computational cell, for nine 1° by 1° cells in the neighborhood of Tucson, Ariz.

As shown in FIG. 5, the vertical axis of each plot is rainfall. The dots connected by lines show the observed rainfall. The darker solid line is the P predictor and the lighter line is the W predictor. A statistical test was conducted based on likelihood calculations using a simple logistic regression fit to the simulated data, then standardized to have linear predictors (of the logit function on the real data as close as possible to unit variance) to combine the two models. Even though the models are hierarchical, the estimation approach makes it difficult to account for how many parameters are being estimated, so p-values are estimated: (1) using likelihood differences distributions calculated under permutation of the underlying time order in the de-seasoned standardized data, and (2) using classical estimates assuming two parameters (the maximum number of scaling parameters) estimated from the likelihood data for each linear model per 1° by 1° cell, and four parameters for the logistic regression.

In extending the models down to the weather station level, the time period being examined was shifted forward. This was to demonstrate true prediction at this level, rather than simple correlation with data gathered at a more coarse level. In particular, data used for fitting and model selection was spring 2000 through summer 2008. Then, the prediction was fall 2008-summer 2009. It became apparent that at the individual weather station level, the logistic regression for the switching parameter estimates were highly over-determined. To help control this, a separately estimated regularizing probability based on assuming variations in Rossby waves in the jet stream were responsible, that these variations were driven by the ENSO, PDO, and AO, as standing waves on the jet stream with frequency proportional to the index of the oscillation, and that the probability of a switch could be calculated from the interference of the standing waves, assuming the combined waves could be treated like a probability amplitude in quantum mechanics.

The independently calculated probability was combined with the logistic probability. Using a Bayesian approach and standard methods of further modifying the data (e.g., bootstrap bias correction, Stein shrinkage towards seasonal means) was applied to the data. The final result was year ahead seasonal prediction of rainfall in northern California running for 1 year with correlation of 0.82 (P=0.09) for the regional averages, and 0.52 (P=2e-6) at the weather station level. Subsequent testing of the procedure on a group of weather stations in Georgia resulted in regional correlation of 0.94 (P=0.03), and 0.43 (P=0.004) at the weather station level.

A further example of application is provided in the PCS Application, which also depicts the use of the averaging and clustering methods of prediction.

Additional Commercial and Industrial Applications

While the disclosed technology is readily designed for weather and climate prediction, embodiments of the present invention may easily be adapted to additional areas of technology. For example, in one embodiment, the technology disclosed herein may be useful for owners of telecom equipment on possible changes in thermal environment for buried installation. In another embodiment, the technology disclosed herein may be advantageous to water utilities, farmers, dam managers, insurance companies, resorts, government and United Nation agencies and non-commercial disaster relief organizations for planning purposes.

In yet further embodiments of the present invention, the technology disclosed herein may be suitable for modeling explosions for military or construction purposes, e.g., the computer modeling used in understanding how nuclear weapons are aging without actual nuclear testing. In additional embodiments, the technology disclosed herein may assist in modeling of the earth's mantle with potential for aiding in prediction of earthquakes and volcanic eruptions. It may also be applied directly to earthquake prediction as shown in the PCS Application.

In further embodiments, the methodology disclosed herein could be used in conjunction with software or experimental tools that model turbulence in combustion systems or in airfoils or boat hulls, allowing computationally faster methods of exploring perturbations to those systems.

In further embodiments, the methodology disclosed herein could be used in conjunction with measurement or dynamic models of complex biological systems ranging from heart muscle to ecosystems allowing faster exploration of small interventions.

In other embodiments, the technology disclosed herein may assisting in predicting impacts of geo-engineering, for example, by using the effect targeted by the geo-engineering method (e.g., reduced sunlight), as one of the parameters in the prediction equations.

In further embodiments, the methodology disclosed herein could be used in conjunction weather modification methods aimed at short term modification, predicting the results of such short term modifications with reduced computational efforts, or since linear calculations are so much faster than nonlinear ones, as a method of guiding such modification on a fine scale as part of a control system.

In further embodiments, the technology disclosed herein may assist in identifying improvements in dynamic models (as well as stochastic dynamic models) used for prediction of any non-linear system, such as financial or economic systems. Similarly, in certain embodiments, the technology disclosed herein may be used in conjunction with reasonable dynamic models, or historical data sets of financial or economic systems to provide predictions of the effects of various transactions or interventions on a market place.

In yet another embodiment, the technology disclosed herein may be utilized to implement a method of constructing estimates of strange attractors. In order to implement such a method, embodiments of the present invention may be broken down into its simplest steps, namely, performing one of either (a) running the dynamic system with constant tuning parameters for a sufficiently long time to allow for an estimation of the statistical characteristics of an attractor, or (b) running the dynamic system several times through a set of tuning parameters of interest. Subsequently, using a mathematical transformation, estimation can be made of the statistical characteristics of the attractor or its projections at a constant tuning parameter directly or indirectly from the form of the equations. Then, a plurality of linear prediction functions may be extracted from state variables or functions of state variables of the dynamic system. Lastly, the linear prediction functions may be compared to historical data of the dynamic model to extract predictive functions therefrom.

It should be appreciated by embodiments of the present invention, although not described in detail, many of the steps disclosed herein require a computer, such as a general purpose computer or the like, having a processor and memory therein, for execution of complicated mathematical algorithms to obtain data and create the requisite models as disclosed herein. Such computer may include any type of computer system utilized by those of ordinary skill in the art. In addition, many of the instructions of the methods disclosed herein may be programmed and stored on a computer-readable medium for processing by components of such computer systems. It should also be appreciated that none of the computer-implemented steps of the disclosed methods are simple or merely extra-solution activity to the overall complex methods and systems of embodiments of the present invention.

Furthermore, it should be appreciated, the specification of particular statistical methods (e.g., FDR, Stein shrinkage, etc.) in the examples and embodiments disclosed herein, are not meant to limit the scope, but rather, provide concreteness in the examples. There are numerous statistical methods that may be applied in place of those mentioned, and may be accepted in the industry as suitable equivalents. This equivalency includes, but is not limited to, simultaneous estimation and selection of the predictive functions using both the GCM and historical data together, for example with different weights to each kind of data.

In addition to the novel applications of the disclosed technology in various forms as described hereinabove, embodiments of the present invention also provide a method of determining the accuracy of known, existing, or future method of prediction for chaotic and quasi-chaotic systems (e.g., each of the systems described herein). By implementing the methodology disclosed herein in an inverse fashion with other prediction methods, the accuracy of such systems may be revealed. The benefits of this type of embodiment of the present invention are countless, such that numerous prediction systems (e.g., financial/stock market prediction tools, weather tools, etc.) derive a significant amount of revenue based on their ability to be accurate. By utilizing embodiments of the present invention, a comparative analysis between two competing prediction systems could be prepared.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention are further scalable to allow for additional clients and servers, as particular applications may require.

What is claimed is:

1. A method for predicting climate comprising:
    deriving a climate attractor from a global climate model, wherein a tuning parameter for the climate attractor comprises a value of total energy for moving air and water on the earth's surface;
    estimating a predictive function for each of a plurality of computational cells within the global climate model; and
    predicting an approximate climate functional of interest for a given specific location utilizing a combination of the predictive functions from each of the plurality of computational cells geographically proximate the location and a set of historical data regarding the climate functional.

2. The method of predicting climate of claim 1, wherein the total energy for moving air and water on the earth's surface is surrogated by a global average surface temperature.

3. The method of predicting climate of claim 1, wherein deriving a climate attractor from a global climate model comprises at least one of:
    running the global climate model a plurality of times through a predetermined global average surface temperature, using different realistic starting points and using realistic trajectories of greenhouse gas levels, until there is sufficient characterization of the statistical structure of the assumed attractor; or
    running the global climate model until it reaches a steady state proximate a target global average surface temperature for a plurality of years, and setting a greenhouse gas level at a steady state, until there is sufficient characterization of the statistical structure of the assumed attractor.

4. The method of predicting climate of claim 1, wherein estimating a predictive function for each of a plurality of computational cells within the global climate model comprises:
    selecting an approximate functional of climate of interest;
    selecting a set of state variables for the approximate functionals;
    determining an initial set of predictor functions from the climate attractor; and
    ascertaining a predictor function within the initial set of predictor functions having the highest positive correlation to the climate of interest when applied to a set of historical data regarding the climate of interest.

5. The method of predicting climate of claim 4, further comprising:
    establishing a neighborhood of variables for the climate of interest utilized for the predictive function; and
    determining a set of improved predictive functions associated with the neighborhood of variables for the climate of interest by utilizing the climate attractor.

6. The method of predicting climate of claim 4, further comprising: evaluating at least one complementary predictive function obtained from a second computational cell yielding improved prediction results for a climate of interest for a period of time at a local level within a first computational cells.

7. The method of predicting climate of claim 6, further comprising: utilizing a transformation-based regression estimate of probability to estimate which complementary predictive function is active at the local level over a particular period of time.

8. The method of predicting climate of claim 7, further comprising:
    utilizing theoretically derived approximations to Rossby waves in the jet stream to guide an estimation of the combination of each set of complementary predictive functions.

9. The method of predicting climate of claim 8, wherein an estimation of the combination of each set of complementary predictive functions is conducted utilizing a Bayesian combination of the Rossby wave probability with a probability of combination using a logistic regression method based on a linear model estimation.

10. The method of predicting climate of claim 9, wherein if an estimation is determined to not be sufficiently precise, the computational cells are subdivided into sub regions, and data from the global climate model for each sub region is compared with historical data of the sub region.

11. The method of predicting climate of claim 10, wherein the subdivided cells are used to rerun a global climate model, and sub region comparison is run on the rerun.

12. The method of predicting climate of claim 10 wherein the subdivided cells are use to define a regional climate model, and the boundary values of the regional climate model are obtained from the global climate model, and results of the regional climate model are compared to historical data to produce a set of prediction functions.

13. A method for predicting climate comprising:
    deriving a climate attractor from a global climate model, wherein the steps of deriving the climate attractor comprise at least one of:
        running the global climate model a plurality of times through a predetermined global average surface temperature, using different realistic starting points and using realistic trajectories of greenhouse gas levels, until there is sufficient characterization of the statistical structure of the assumed attractor; or running the global climate model until it reaches a steady state proximate a target global average surface temperature for a plurality of years, and setting a greenhouse gas level at a steady state, until there is sufficient characterization of the statistical structure of the assumed attractor;

wherein a tuning parameter for the climate attractor comprises a global average surface temperature;

estimating a predictive function for each of a plurality of computational cells within the global climate model, wherein such estimation comprises:

selecting an approximate functional of climate of interest;

selecting a set of state variables for the approximate functionals;

determining an initial set of predictor functions from the climate attractor; and ascertaining a predictor function within the initial set of predictor functions having the highest positive correlation to the climate of interest when applied to a set of historical data regarding the climate of interest; and predicting an approximate climate functional of interest for a given specific location utilizing a combination of the predictive functions from each of the plurality of computational cells geographically proximate the location.

14. The method of predicting climate of claim 13, further comprising:

establishing a neighborhood of variables for the climate of interest utilized for the predictive function; and determining a set of improved predictive functions associated with the neighborhood of variables for the climate of interest by utilizing the estimate of the climate attractor.

15. The method of predicting climate of claim 13, further comprising: evaluating at least one complementary predictive function obtained from a second computational cell yielding improved prediction results for a climate of interest for a period of time at a local level within a first computational cells.

16. The method of predicting climate of claim 15, further comprising: utilizing a transformation-based regression estimate of probability to estimate which complementary predictive function is active at the local level over a particular period of time.

17. The method of predicting climate of claim 13, further comprising:

utilizing theoretically derived approximations to Rossby waves in the jet stream to guide an estimation of the combination of each set of complementary predictive functions.

18. The method of predicting climate of claim 17, wherein an estimation of the combination of each set of complementary predictive functions is conducted utilizing a Bayesian combination of the Rossby wave probability with a probability of combination using a logistic regression method based on a linear model estimation.

19. A system for predicting climate comprising:

a computer-readable medium comprising a computer program having executable code, the computer program for enabling data pairing, the computer program comprising instructions for:

deriving a climate attractor from a global climate model, wherein a tuning parameter for the climate attractor comprises a value of total energy for moving air and water on the earth's surface;

estimating a predictive function for each of a plurality of computational cells within the global climate model; and predicting an approximate climate functional of interest for a given specific location utilizing a combination of the predictive functions from each of the plurality of computational cells geographically proximate the location and a set of historical data regarding the climate functional.

20. The system of claim 19, wherein the total energy for moving air and water on the earth's surface is surrogated by a global average surface temperature.

21. The system of claim 20, wherein deriving a climate attractor from a global climate model comprises at least one of:

running the global climate model a plurality of times through a predetermined global average surface temperature, using different realistic starting points and using realistic trajectories of greenhouse gas levels, until there is sufficient characterization of the statistical structure of the assumed attractor; or running the global climate model until it reaches a steady state proximate a target global average surface temperature for a plurality of years, and setting a greenhouse gas level at a steady state, until there is sufficient characterization of the statistical structure of the assumed attractor.

22. The system of claim 19, wherein estimating a predictive function for each of a plurality of computational cells within the global climate model comprises:

selecting an approximate functional of climate of interest;

selecting a set of state variables for the approximate functionals;

determining an initial set of predictor functions from the climate attractor; and ascertaining a predictor function within the initial set of predictor functions having the highest positive correlation to the climate of interest when applied to a set of historical data regarding the climate of interest.

23. The system of claim 22, further comprising:

establishing a neighborhood of variables for the climate of interest utilized for the predictive function;

determining a set of improved predictive functions associated with the neighborhood of variables for the climate of interest by utilizing the climate attractor; and evaluating of at least one complementary predictive function obtained from a second computational cell yielding improved prediction results for a climate of interest for a period of time at a local level within a first computational cells.

* * * * *